US011329753B2

(12) United States Patent
Lee et al.

(10) Patent No.: US 11,329,753 B2
(45) Date of Patent: May 10, 2022

(54) ELECTRONIC WARFARE SYSTEM DEVICE WITH NON-REAL-TIME THREAT SIGNAL ANALYSIS AND ELECTRONIC ATTACK FUNCTION

(71) Applicant: AGENCY FOR DEFENSE DEVELOPMENT, Daejeon (KR)

(72) Inventors: Junghoon Lee, Daejeon (KR); Jeil Jo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 302 days.

(21) Appl. No.: 16/365,951

(22) Filed: Mar. 27, 2019

(65) Prior Publication Data

US 2020/0213029 A1 Jul. 2, 2020

(30) Foreign Application Priority Data

Dec. 28, 2018 (KR) ........................ 10-2018-0172733

(51) Int. Cl.
*H04B 17/00* (2015.01)
*H04K 3/00* (2006.01)

(52) U.S. Cl.
CPC ................. *H04K 3/62* (2013.01); *H04K 3/45* (2013.01); *H04K 3/80* (2013.01)

(58) Field of Classification Search
CPC .. H04K 3/62; H04K 3/80; H04K 3/45; H04K 3/44; H04K 3/94; H04K 3/65; G01S 7/36; G01S 7/38
See application file for complete search history.

(56) References Cited

U.S. PATENT DOCUMENTS

| | | | | |
|---|---|---|---|---|
| 9,565,208 | B2 | 2/2017 | Ibatullin et al. | |
| 10,473,758 | B2 | 11/2019 | Caldwell et al. | |
| 2017/0293019 | A1* | 10/2017 | Caldwell .................. | G01S 7/38 |
| 2020/0266915 | A1* | 8/2020 | Oshima ..................... | G01S 7/38 |

FOREIGN PATENT DOCUMENTS

| | | | |
|---|---|---|---|
| KR | 2003-0054594 | A | 7/2003 |
| KR | 10-0916970 | B1 | 9/2009 |
| KR | 10-1201372 | B1 | 11/2012 |
| KR | 10-1280512 | B1 | 7/2013 |

(Continued)

OTHER PUBLICATIONS

Park (Modeling and simulation of radar response to electronic attack in EW) 20180405 (Year: 2018).*

(Continued)

*Primary Examiner* — Keith Ferguson
(74) *Attorney, Agent, or Firm* — Ostrolenk Faber LLP

(57) ABSTRACT

Provided are electronic warfare system device including: an electronic warfare support unit for receiving a threat signal and generating a Pulse Description Word (PDW) using the received threat signal; an electronic warfare system display for downloading the PDW to perform a threat signal analysis and selecting an electronic attack technique based on the threat signal analysis; and an electronic attack unit for outputting at least one of noise jamming and deception jamming based on the electronic attack technique selected in the electronic warfare system display to perform an electronic attack.

5 Claims, 2 Drawing Sheets

(56) References Cited

FOREIGN PATENT DOCUMENTS

| | | | | |
|---|---|---|---|---|
| KR | 10-1522207 | B1 | | 5/2015 |
| KR | 101754708 | B1 | * | 7/2017 |
| KR | 2018-0128475 | A | | 12/2018 |
| KR | 102100851 | B1 | * | 4/2020 |

OTHER PUBLICATIONS

Search Report dated Aug. 30, 2018 for corresponding Korean Patent Application No. 10-2018-0172733.
Office Action dated Mar. 20, 2020 in corresponding Korean Patent Application No. 10-2018-0172733.

* cited by examiner

ELECTRONIC WARFARE SYSTEM DEVICE WITH NON-REAL-TIME THREAT SIGNAL ANALYSIS AND ELECTRONIC ATTACK FUNCTION

CROSS-REFERENCE TO RELATED APPLICATION

Pursuant to 35 U.S.C. § 119(a), this application claims the benefit of earlier filing date and right of priority to Korean Application No. 10-2018-0172733, filed on Dec. 28, 2018, the contents of which is incorporated by reference herein in its entirety.

BACKGROUND OF THE INVENTION

1. Field of the Invention

The present invention relates to an electronic warfare system device for performing a non-real-time threat signal analysis and an electronic attack function, which analyzes threat signals, analyzes them in real-time, and performs electronic attacks in response thereto.

2. Background of the Invention

The electronic warfare system is broadly divided into an Electronic Warfare Support (ES) unit for electronic warfare support and an Electronic Attack (EA) unit for electronic attack.

Electronic warfare support detects, identifies, identifies, and locates the electromagnetic spectrum. The electronic attack performs noise jamming using noise, deception jamming for storing the received radar signal in a memory and modulating and re-transmitting the phase, size, etc. of the stored signal, and composite jamming using noise and deception jamming simultaneously.

In general, the electronic warfare system receives threat signals and outputs an electronic attack technique corresponding thereto in real-time.

In such a way, the process of receiving a threat signal in real-time and outputting an electronic attack technique is suitable for a real environment, but it is not easy when changing the hardware performance of the electronic warfare system that develops the algorithm by analyzing the threat signal.

Also, when real-time response is performed in the electronic warfare support field, it is not possible to change the Pulse Description Word (PDW) format, which is a format for representing a received signal of a threat signal according to the type of electronic warfare system.

Moreover, in order to analyze real-time threat signals, a high-performance single board computer (SBC) is required to support electronic warfare. Instead of analyzing the threat signal by various algorithms, the threat signal is analyzed only by the mounted signal analysis algorithm, so that there are disadvantages that it is not easy to compare several algorithms when developing an algorithm.

Also, in relation to electronic attack, electronic attack techniques corresponding to threats are performed in real-time through threat analysis. There is a disadvantage that Single Board Computer (SBC) is required for resource allocation, technique generation, and control necessary for an electronic attack in real-time.

SUMMARY OF THE INVENTION

Therefore, an aspect of the detailed description is to provide a device for analyzing a threat signal in a non-real-time using an electronic warfare system device without a SBC, which is a real-time signal processing computer, and performing an electronic attack function to evaluate the performance of an electronic warfare system device.

To achieve these and other advantages and in accordance with the purpose of this specification, as embodied and broadly described herein, there is provided an electronic warfare system device including: an electronic warfare support unit for receiving a threat signal and generating a Pulse Description Word (PDW) using the received threat signal; an electronic warfare system display for downloading the PDW to perform a threat signal analysis and selecting an electronic attack technique based on the threat signal analysis; and an electronic attack unit for outputting at least one of noise jamming and deception jamming based on the electronic attack technique selected in the electronic warfare system display to perform an electronic attack.

The electronic warfare support unit may include: an RF receiving plate for receiving a threat signal and converting the thread signal from a high frequency to an intermediate frequency; a digital receiving plate for converting the threat signal converted into the intermediate frequency into an I/Q signal and generating a Pulse Description Word (PDW) for the threat signal using the I/Q signal; a PDW storing plate for storing the generated PDW; and a receiving control plate for controlling the RF receiving plate, the digital receiving plate, and the PDW storing plate.

The electronic attack unit may include: a noise generating plate for generating noise jamming; a DRFM processing plate for generating deception jamming; a high-frequency processing plate for down-converting the received threat signal from a high frequency to an intermediate frequency, or up-converting an intermediate frequency of a deception signal generated in the DRFM processing plate to a high frequency to output the converted signal; a jamming transmission plate for amplifying and outputting a signal down-converted or up-converted in the high-frequency processing plate and received, or selecting and transmitting at least one of noise jamming and deception jamming; and a jamming transmission plate for controlling the noise generating plate, the DRFM processing plate, the high-frequency processing plate, and the jamming transmission plate.

The electronic warfare system display may operate the electronic warfare support unit and the electronic attack unit.

The electronic warfare system device may further include a threat signal simulator for generating a threat signal and outputting the generated threat signal to the electronic warfare support unit and the electronic attack unit.

The electronic warfare system device may further include a scenario simulator for generating a list of threat signals and operating the threat signal simulator and the electronic warfare system display.

The PDW may be downloaded by control of the electronic warfare system display regardless of whether the scenario simulator is operated or not.

The electronic warfare system device may further include a signal measurer for measuring a signal outputted from the electronic attack unit.

An electronic attack performed in the electronic attack unit may not be performed in real-time by a threat analysis of the electronic warfare support unit but may be performed in non-real-time by an electronic attack technique preset in the electronic warfare system display.

The present invention provides an electronic warfare system device having a non-real-time threat signal analysis and an electronic attack function without a single board computer (SBC), which is a real-time signal processing computer. Thus, it is possible to provide an evaluation of the electronic warfare system performance by developing a threat signal analysis algorithm of an electronic warfare support unit and developing an electronic attack resource allocation algorithm of an electronic attack unit.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be connected with the another element or intervening elements may also be present. In contrast, when an element is referred to as being “directly connected with” another element, there are no intervening elements present.

A singular representation may include a plural representation unless it represents a definitely different meaning from the context.

Terms such as “include” or “has” are used herein and should be understood that they are intended to indicate an existence of several components, functions or steps, disclosed in the specification, and it is also understood that greater or fewer components, functions, or steps may likewise be utilized.

Figure 1:
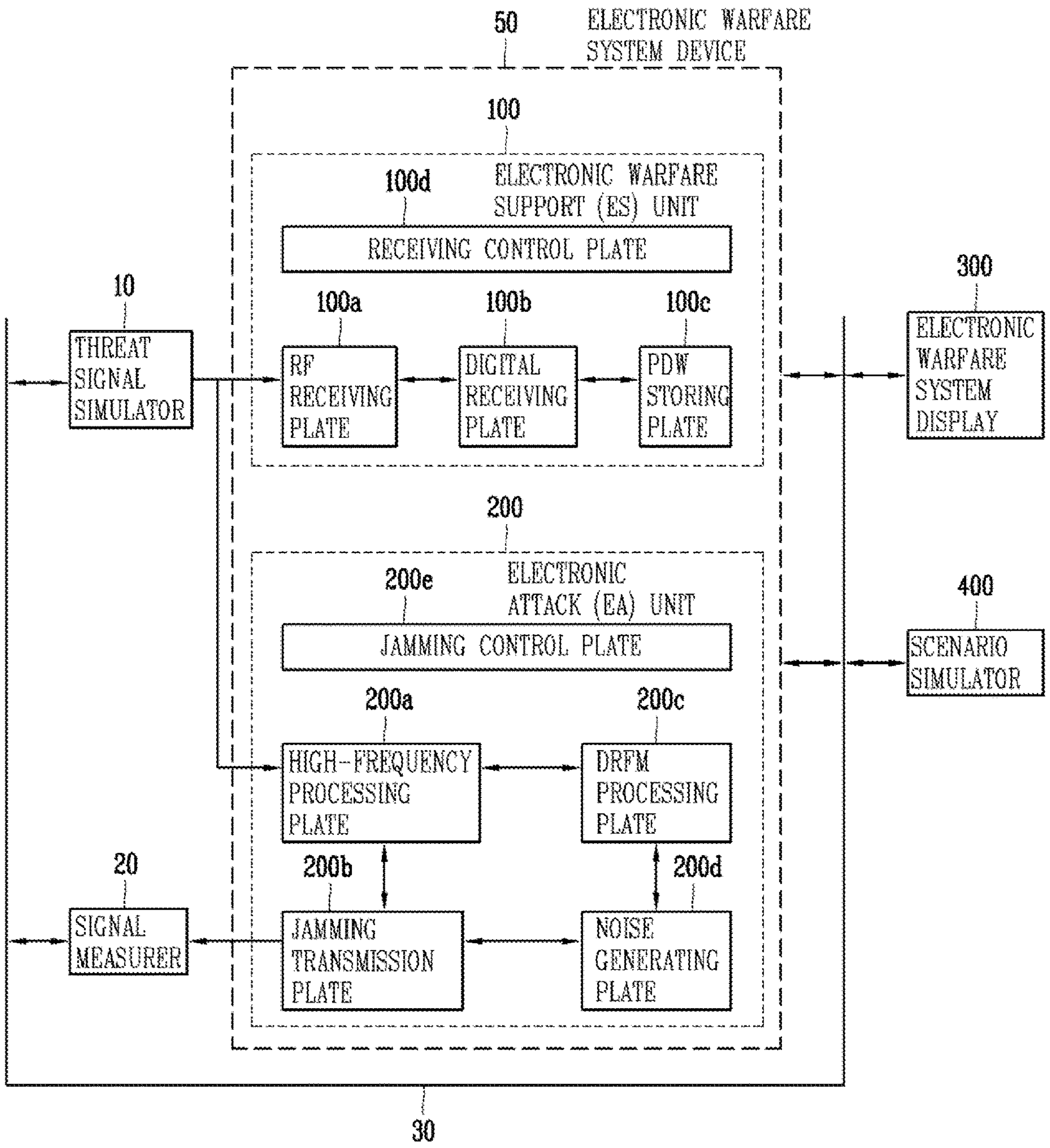
FIG. 1 is a block diagram for explaining an electronic warfare system device having a non-real-time threat signal analysis and an electronic attack function according to an embodiment of the present invention.

FIG. 1 is a block diagram for explaining an electronic warfare system device having a non-real-time threat signal analysis and an electronic attack function according to an embodiment of the present invention.

Referring to FIG. 1, an electronic warfare system device 50 having a non real-time threat signal analysis and an electronic attack function according to the present invention includes an electronic warfare support (ES) unit 100 and an electronic attack (EA) unit 200.

The ES unit 100 may receive a threat signal and generate a Pulse Description Word (PDW) using the received threat signal.

The ES unit 100 may include a radio frequency (RF) receiving plate 100*a*, a digital receiving plate 100*b*, a PDW (Pulse Description Word) storing plate 100*c*, and a receiving control plate 100*d*.

The RF receiving plate 100*a* converts a high-frequency threat signal to an intermediate frequency and filters only a signal inputted to the set reception range of the ES unit 100.

That is, the RF receiving plate 100*a* may be formed to receive a threat signal and convert it from a high frequency to an intermediate frequency.

The intermediate frequency may have a frequency lower than the frequency of the high frequency.

For example, the high frequency may have a frequency of 3 to 30 MHz or more (or 13.56 MHz or more).

The intermediate frequency may refer to a frequency between a radio frequency (RF) and a baseband frequency. As an example, the intermediate frequency may have a frequency between 125.134 kHz, which is the frequency of the low frequency, and the frequency of the high frequency described above.

The high frequency and the intermediate frequency are not limited to the above values and may have different frequencies depending on the applied field and the situation. In addition, when the frequency of the high frequency has a frequency higher than the intermediate frequency, the contents described in this specification may be applied.

The thread signal converted into an intermediate frequency and filtered in the RF receiving plate 100*a* is inputted to the digital receiving plate 100*b*.

The digital receiving plate 100*b* converts the received (converted) intermediate frequency signal into an In-Phase signal and a Quadrature signal. The digital receiving plate 100*b* generates a Pulse Description Word (PDW) (e.g., a frequency of a signal, a signal strength, a pulse width, a phase, a PDW for a time of arrival (TOA)) of the threat signal using an In-phase/Quadrature (I/Q) signal, and stores it in the PDW storing plate 100*c*.

That is, the digital receiving plate 100*b* may convert the threat signal received as the intermediate frequency into an I/Q signal, and using this, generate a PDW including at least one of intensity, frequency, pulse width, phase, and time of arrival (TOA) of a threat signal.

Generally, the electronic warfare system analyzes the signal in real-time, but in the present invention, since the threat signal is analyzed in non-real-time, a predetermined number of PDWs are stored in the PDW storing plate 100*c*. The stored PDW is downloaded according to the command of the electronic warfare system display 300 regardless of whether the scenario simulator 400 is operated or not.

That is, the PDW storing plate 100*c* is formed to store the generated PDW.

The receiving control plate 100*d* (or the receiving control unit) may control the RF receiving plate 100*a*, the digital receiving plate 100*b*, and the PDW storing plate 100*c* provided in the ES unit 100.

The EA unit 200 may be formed to output an at least one of a noise jamming (or a noise signal) and a deception jamming (or a deception signal) to perform an electronic attack based on the electronic attack technique selected in the electronic warfare system display 300.

The electronic attack of the present invention may include, for example, a noise jamming or deception jamming output, or an output combining noise jamming and deception jamming.

The EA unit 200 may include a high-frequency processing plate 200*a*, a jamming transmission plate 200*b*, a digital radio frequency (DRFM) processing plate 200*c*, a noise generating plate 200*d*, and a jamming control plate 200*e*.

The high-frequency processing plate 200*a* may down-convert the received threat signal from a high frequency to an intermediate frequency.

In addition, the high-frequency processing plate 200*a* may up-convert the intermediate frequency of the deception signal generated by the DRFM processing plate 200*c* to a high frequency and output it.

The explanation on the high frequency and the intermediate frequency will be replaced with the above-described contents.

The jamming transmission plate 200*b* may amplify a signal, which is down-converted or up-converted by the high-frequency processing plate 200*a* and received, and output the amplified signal.

Also, the jamming transmission plate 200*b* may select and transmit at least one of noise jamming and deception jamming.

The DRFM processing plate 200*c* may be formed to generate a deception jamming (or deception signal).

The noise generating plate 200*d* may be formed to generate noise jamming (or noise signal).

The jamming control plate 200*e* (or jamming control unit) may control components included in the EA unit 200 and may be responsible for controlling the lower plate of the EA unit 200.

The jamming control plate 200*e* (or jamming control unit) may control a high-frequency processing plate 200*a*, a jamming transmission plate 200*b*, a DRFM processing plate 200*c*, and a noise generating plate 200*d* provided in the EA unit 200.

In addition, the present invention may include an electronic warfare system display 300 for downloading (receiving) the PDW generated in the ES unit 100 of the electronic warfare system device 50 and stored in the PDW storing plate 100*c*, analyzing threat signals, and controlling the electronic warfare system device 50.

That is, the electronic warfare system display 300 may download the PDW to perform a threat signal analysis, and may select an electronic attack technique based on the threat signal analysis.

Further, the present invention may further include a threat signal simulator 10, and the threat signal simulator 10 may be formed to generate a threat signal.

In addition, the present invention may further include a signal measurer 20, and the signal measurer 20 may be formed to measure an output signal of an electronic attack outputted from the EA unit 200.

The signal measurer 20 may be controlled (operated) by the scenario simulator 400 or may be operated by separate user control.

In addition, the present invention may further include a scenario simulator 400, and the scenario simulator 400 may be formed to generate a list of threat signals and to operate (or control) the threat signal simulator 10 and the electronic warfare system display 300.

The electronic warfare system display 300 may operate (or control) each of the ES unit 100 and the EA unit 200.

In addition, the electronic warfare system display 300 may be controlled by the scenario simulator 400.

The electronic warfare system display 300 may download (receive) the PDW stored in the PDW storing plate 100*c* and perform threat analysis (or threat signal analysis).

On the other hand, the threat signal simulator 10, the signal measurer 20, the electronic warfare system display 300 and the scenario simulator 400 described above may be included in the electronic warfare system device 50. That is, the threat signal simulator 10, the signal measurer 20, the electronic warfare system display 300, and the scenario simulator 400 are included in the electronic warfare system device 50 described in this specification.

In addition, the threat signal simulator 10, the signal measurer 20, the electronic warfare system display 300, and the scenario simulator 400, as shown in FIG. 1, may be separate devices formed to communicate with the electronic warfare system device 50.

The EA unit 200 may perform an electronic attack through a predetermined jamming technique in the electronic warfare system display 300 instead of performing a real-time electronic attack by the threat analysis of the ES unit 100.

That is, the present invention may perform the electronic attack in non-real-time using the jamming technique preset in the electronic warfare system display 300 instead of performing the electronic attack in real-time.

In other words, the electronic attack that is performed in the EA unit may not be performed in real-time by the threat analysis of the ES unit 100, but may be performed in non-real-time by an electronic attack technique preset in the electronic warfare system display 300 (or selected by the electronic warfare system display 300).

Hereinafter, with reference to the accompanying drawings, a method of analyzing a threat signal in non-real time and performing an electronic attack through the electronic warfare system device 50 of the present invention will be described in more detail.

Figure 2:
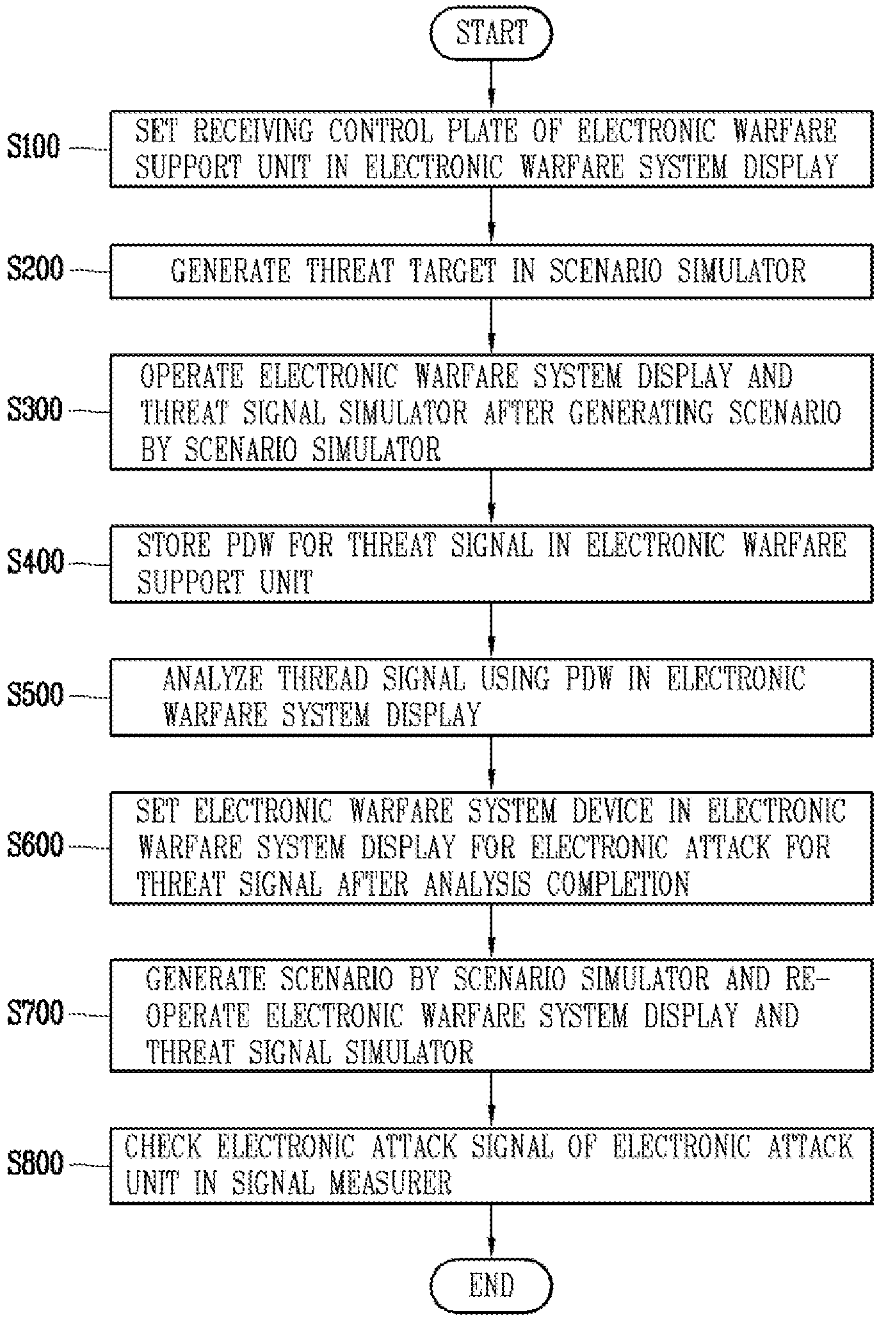
FIG. 2 is a flowchart for explaining a control method of an electronic warfare system device having a non-real-time threat signal analysis and an electronic attack function according to an embodiment of the present invention.

FIG. 2 is a flowchart for explaining a control method of an electronic warfare device having a non-real-time threat signal analysis and an electronic attack function according to an embodiment of the present invention.

First, in the present invention, in order to control the lower plates of the ES unit 100 necessary for the frequency range and number of PDWs required for reception of the threat signal by the electronic warfare system display 300, the receiving control plate 100*d* is set at the beginning (S100).

Since the analysis of the threat signal is not yet made, the value required for setting the EA unit 200 may not be set in the jamming control plate 200*e*.

The scenario simulator 400 generates a threat list (list of threat signals, a threat target) for generating a threat signal (S200).

In order to analyze the threat signal of the electronic warfare system, the scenario simulator 400 may generate scenarios that simulate the threat system and the movement, trajectory, and environment types of the electronic warfare system. Thereafter, the scenario simulator 400 generates a threat signal by operating the threat signal simulator 10 to generate a threat signal based on the generated scenario. In addition, the scenario simulator 400 operates the electronic warfare system display 300 to receive the threat signal (S300).

As the electronic warfare system display 300 is operated, the ES unit 100 may be operated. As the electronic warfare system display 300 is operated, the ES unit 100 may be operated under the control of the electronic warfare system display 300.

The communication of the electronic warfare system display 300, the scenario simulator 400, the threat signal simulator 10, the signal measurer 20, and the electronic warfare system device 50 may be performed through wire/wireless communication, and for example, it may be performed through the LAN 30.

The threat signal generated by the threat signal simulator 10 is inputted to the RF receiving plate 100*a* of the ES unit 100 and is inputted to the high-frequency processing plate 200*a* of the electronic warfare unit 200 to be used for electronic attacks.

That is, the threat signal simulator 10 may generate a threat signal and output the generated threat to the RF receiving plate 100*a* of the ES unit and the high-frequency processing plate 200*a* of the EA unit.

The RF receiving plate 100*a* converts a high-frequency threat signal to an intermediate frequency and filters only a signal inputted to the set reception range of the ES unit.

The thread signal converted into an intermediate frequency and filtered in the RF receiving plate 100*a* is inputted to the digital receiving plate 100*b*.

The digital receiving plate 100*b* converts the received intermediate frequency signal into an In-Phase signal and a Quadrature signal. The digital receiving plate 100*b* generates a Pulse Description Word (PDW) (e.g., a frequency of a signal, a signal strength, a pulse width, and a PDW of a phase) of the threat signal using an In-phase/Quadrature (I/Q) signal, and stores it in the Generally, the electronic warfare system analyzes the signal in real-time, but in the present invention, since the threat signal is analyzed in non-real time, a predetermined number of PDWs are stored in the PDW storing plate 100*c*. The stored PDW is downloaded according to the command of the electronic warfare system display 300 regardless of whether the scenario simulator 400 is operated or not.

The electronic warfare system display 300 performs a threat signal analysis using the downloaded PDW (S500). Based on the threat signal analysis results, the electronic warfare system display 300 may select any one electronic jamming technique from noise jamming or deception jamming.

When the threat signal analysis is completed, it is necessary to select a suitable electronic attack technique and verify the output of the electronic attack signal.

Therefore, after completing the threat signal analysis, for the electronic attack on the threat signal, the electronic warfare system display 300 sets a control value in the electronic warfare system device 50 (S600). In the ES unit 100, the lower plate of the ES unit 100 is controlled through the receiving control plate 100*d*, and in the EA unit 200 (or the electronic warfare attack unit), the lower plate of the EA unit 200 is controlled through the jamming control plate 200*e*.

The electronic warfare system display 300 may set the control value of the EA unit 200 so that an electronic attack is performed through the selected electronic attack technique.

For example, the control value of the EA unit 200 may be set so that when the electronic attack technique is noise (or noise jamming), an electronic attack is performed using a noise generating plate 200*d*, and when the electronic attack technique is deception (or deception jamming), an electronic attack is performed using the DRFM processing plate 200*c*.

That is, according to the selected electronic attack technique, whether or not the plates included in the EA unit are operated is determined.

Frequency down-conversion or up-conversion of a threat signal required for an electronic attack of deception (or deception jamming) using a digital radio frequency memory (DRFM) may be performed in the high-frequency processing plate 200*a*. Also, the jamming transmission plate 200*b* may amplify an electronic attack signal (a noise signal or a deception signal), and combine an electronic attack technique (noise jamming or deception jamming).

In order to check the normal operation of the EA unit by the threat signal analysis of the electronic warfare system, the process performed in S300 is repeated (S700).

In step S700, the scenario simulator 400 operates the electronic warfare system display 300 and the threat signal simulator 10 to check the normal operation of the EA unit.

In other words, the scenario simulator 400 generates scenarios that simulate the motions, trajectories, and environment types of the threat system and the electronic warfare system, generates a threat signal by operating the threat signal simulator 10 to generate a threat signal based on the generated scenario, and operate the electronic warfare system display 300 to receive a threat signal. When the electronic warfare system display 300 is operated, the ES unit and the EA unit may be operated under the control of the electronic warfare system display 300.

Thereafter, in the present invention, the signal measurer 20 measures and checks whether the electronic attack signal of the EA unit is normally outputted through the signal measurer 20 (S800).

Through such a configuration, the present invention provides an electronic warfare device having a non-real-time threat signal analysis and an electronic attack function without a single board computer (SBC), which is a real-time signal processing computer. Thus, it is possible to provide an evaluation of the electronic warfare system performance by developing a threat signal analysis algorithm of an electronic warfare support unit and developing an electronic attack resource allocation algorithm of an electronic attack unit.

The present invention can be implemented as computer-readable codes (applications or software) in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic warfare system device comprising:

an electronic warfare support unit for receiving a threat signal and generating a Pulse Description Word (PDW) using the received threat signal;

an electronic warfare system display for downloading the PDW to perform a threat signal analysis and selecting an electronic attack technique based on the threat signal analysis;

an electronic attack unit for outputting at least one of noise jamming and deception jamming based on the electronic attack technique selected in the electronic warfare system display to perform an electronic attack;

a threat signal simulator for generating the threat signal and outputting the generated threat signal to the electronic warfare support unit and the electronic attack unit; and a scenario simulator for generating a list of threat signals, the threat signal being generated by the threat signal simulator, and operating the threat signal simulator and the electronic warfare system display;

wherein the PDW is downloaded by control of the electronic warfare system display regardless of whether the scenario simulator is operating or not, wherein a predetermined number of PDWs are stored in a PDW storing plate included in the electronic warfare support unit in order to analyze the threat signal in non-real time, wherein an electronic attack performed in the electronic attack unit is not performed in real-time by a threat analysis of the electronic warfare support unit but is performed in non-real-time by an electronic attack technique preset in the electronic warfare system display, wherein the electronic warfare system display sets a beginning condition required for reception of the threat signal by the electronic warfare support unit, and the threat signal analysis is performed based on the generated PDW using the threat signal which is received based on the beginning condition, and wherein the scenario simulator regenerates the threat signal by operating the threat signal simulator to regenerate the threat signal, and operates the electronic warfare system display to receive the threat signal, in order to check a normal operation of the electronic attack unit, after completing the threat signal analysis by the electronic warfare system display in order to check a normal operation of the electronic attack unit.

2. The electronic warfare system device of claim 1, wherein the electronic warfare support unit comprises:

an RF receiving plate for receiving a threat signal and converting the thread signal from a high frequency to an intermediate frequency;

a digital receiving plate for converting the threat signal converted into the intermediate frequency into an I/Q signal and generating a Pulse Description Word (PDW) for the threat signal using the I/Q signal;

the PDW storing plate for storing the generated PDW; and a receiving control plate for controlling the RF receiving plate, the digital receiving plate, and the PDW storing plate.

3. The electronic warfare system device of claim 1, wherein the electronic attack unit comprises:

a noise generating plate for generating the noise jamming;

a Digital Radio Frequency Memory (DRFM) processing plate for generating the deception jamming;

a high-frequency processing plate for down-converting the received threat signal from a high frequency into an intermediate frequency, or up-converting an intermediate frequency of a deception signal generated in the DRFM processing plate into a high frequency to output the converted signal;

a jamming transmission plate for amplifying and outputting a signal down-converted or up-converted in the high-frequency processing plate and received, or selecting and transmitting at least one of the noise jamming and the deception jamming; and a jamming transmission plate for controlling the noise generating plate, the DRFM processing plate, the high-frequency processing plate, and the jamming transmission plate.

4. The electronic warfare system device of claim 1, wherein the electronic warfare system display operates the electronic warfare support unit and the electronic attack unit.

5. The electronic warfare system device of claim 1, further comprising a signal measurer for measuring signal outputted from the electronic attack unit.

* * * * *